No. 683,108. Patented Sept. 24, 1901.
J. C. DUROUAUX.
EYEGLASSES OR SPECTACLES.
(Application filed July 1, 1901.)
(No Model.)
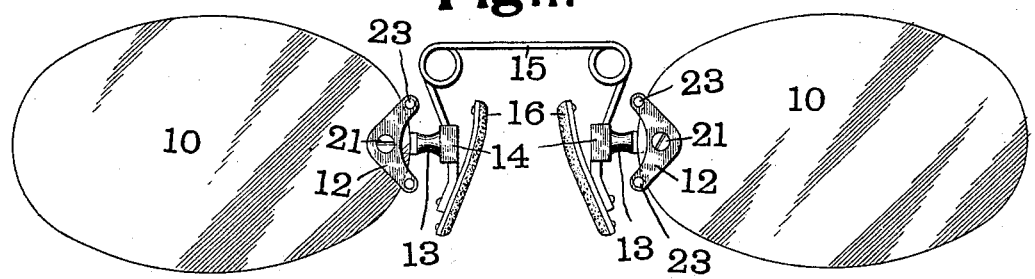
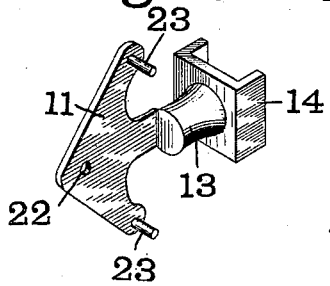 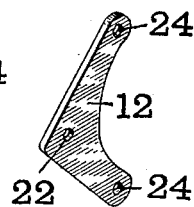
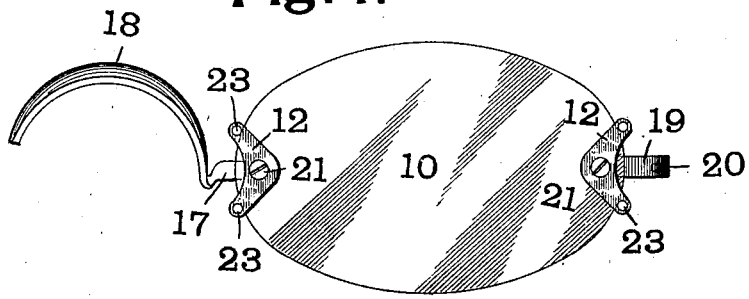
Witnesses
W. A. Alexander
J. R. Watkins
Inventor
J. C. Durouaux
By Attorneys
Fowler & Bryson
THE NORRIS PETERS CO., PHOTO-LITHO., WASHINGTON, D. C.

UNITED STATES PATENT OFFICE.

JOSEPH C. DUROUAUX, OF ST. LOUIS, MISSOURI.

EYEGLASSES OR SPECTACLES.

SPECIFICATION forming part of Letters Patent No. 683,108, dated September 24, 1901.

Application filed July 1, 1901. Serial No. 66,643. (No model.)

*To all whom it may concern:*

Be it known that I, JOSEPH C. DUROUAUX, a citizen of the United States, residing at the city of St. Louis, in the State of Missouri, have invented a certain new and useful Improvement in Eyeglasses or Spectacles, of which the following is such a full, clear, and exact description as will enable any one skilled in the art to which it appertains to make and use the same, reference being had to the accompanying drawings, forming part of this specification.

My invention relates to improvements in eyeglasses or spectacles, and more particularly to straps for securing the frames to skeleton eyeglasses or spectacles.

One object of my invention is to provide a strap which can be adapted to any thickness of lens.

Another object of my invention is to so construct the strap that the lens will be firmly held, so that it cannot work loose on the glass screw.

My invention consists in part in the combination, with the lens of an eyeglass or spectacle, of a clamping-plate fitting against one side of said lens, a frame-supporting member carried by said clamping-plate, a second clamping-plate fitting against the other side of said lens, a clamping-screw passing through both of said clamping-plates and said lens, and a pin connecting said clamping-plates, said pin being arranged at one side of the clamping-screw and bearing against the edge of the lens to prevent the rotation of the same on said clamping-screw.

My invention also consists in other novel features and details of construction, all of which are described in the following specification and pointed out in the claims affixed hereto.

In the accompanying drawings, which illustrate my invention, Figure 1 is a view of a pair of eyeglasses. Figs. 2 and 3 are enlarged isometric projections showing details of construction, and Fig. 4 is a view of a portion of a pair of spectacles.

Like marks of reference refer to similar parts in the several views of the drawings.

10 represents the lenses, to which the frames are secured by means of the straps. Each of the straps consists of two substantially triangular clamping-plates 11 and 12. To each of the clamping-plates 11 and 12 is secured a frame-supporting member. In the case of a pair of eyeglasses this frame-supporting member will consist of a post 13 and box 14, in which are secured the spring 15 and the nose-guard 16. In the case of a pair of spectacles the frame-supporting member on the clamping-plate 11 at the inner end of the lens will consist in the end 17 of the bridge 18. At the outer end of the lens the frame-supporting member will consist of an end piece 19, in which the temple 20 is pivoted. The lens 10 is secured between the clamping-plates 11 and 12 by means of the glass-screw 21, which passes through openings 22 in the said clamping-plates and through the lens. Carried by the clamping-plate 11 are two pins 23, against which the edge of the lens 10 bears. These pins 23 may be of any suitable form, but are preferably cylindrical and smooth-surfaced, as shown in Fig. 2 of the drawings. The pins 23 pass through corresponding openings 24 in the clamping-plate 12. These pins 23 should be of such length that they will pass through the plate 12 when the thickest lenses are used. When thinner lenses are used, the ends of the pins 23 may be filed off flush with the face of the clamping-plate 12 after the plates have been secured in position by means of the glass-screw 21.

It will be seen that with my strap a lens of any thickness can be used, and at the same time the lens is firmly held between the clamping-plates and prevented from rotating on the screw 21 by means of the pins 23.

I am aware that straps for skeleton eyeglasses and spectacles have been heretofore made in which but a single clamping-plate was used, which clamping-plate was provided with an arm adapted to come in contact with a finger carried on a washer at the opposite side of the lens, and therefore do not claim such construction.

Having fully described my invention, what I claim as new, and desire to secure by Letters Patent of the United States, is—

1. In a pair of eyeglasses or spectacles, the combination with a lens, of a clamping-plate fitting against one side of said lens, a frame-supporting member carried by said clamping-plate, a second clamping-plate fitting on the other side of said lens, a clamping-screw passing through both of said clamping-plates and said lens, and a pin connecting said clamping-plates, said pin being situated at one side of said clamping-screw and bearing against the edge of the lens to prevent the rotation of the same on said clamping-screw.

2. In a pair of eyeglasses or spectacles, the combination with a lens, of a clamping-plate fitting against one side of said lens, a frame-supporting member carried by said clamping-plate, a second clamping-plate fitting on the other side of said lens, a clamping-screw passing through both of said clamping-plates and said lens, and a pin rigidly carried by one of said clamping-plates and passing freely through an opening in the other of said plates, said pin being situated at one side of the clamping-screw and bearing against the edge of the lens to prevent the rotation of the same on said clamping-screw.

3. In a pair of eyeglasses or spectacles, the combination with a lens, of a clamping-plate fitting against one side of said lens, a frame-supporting member carried by said clamping-plate, a second clamping-plate fitting on the other side of said lens, a clamping-screw passing through both of said clamping-plates and said lens, and a pair of pins connecting said clamping-plates, one of said pins being situated at each side of the clamping-screw and bearing against the edge of the lens to prevent the rotation of the same on said clamping-screw.

4. In a pair of eyeglasses or spectacles, the combination with a lens, of a clamping-plate fitting against one side of said lens, a frame-supporting member carried by said clamping-plate, a second clamping-plate fitting against the other side of said lens, a clamping-screw passing through both of said clamping-plates and said lens, and a pair of pins rigidly carried by one of said clamping-plates and passing freely through openings in the other of said plates, one of said pins being situated at each side of the clamping-screw and bearing against the edge of the lens to prevent the rotation of the same on said clamping-screw.

In testimony whereof I have hereunto set my hand and affixed my seal in the presence of the two subscribing witnesses.

JOSEPH C. DUROUAUX. [L. S.]

Witnesses:
JAMES H. BRYSON,
JESSIE R. WATKINS.